(12) United States Patent
Huang et al.

(10) Patent No.: US 11,426,981 B2
(45) Date of Patent: *Aug. 30, 2022

(54) POLYMER FILM AND USES OF THE SAME

(71) Applicant: Chang Chun Petrochemical Co., Ltd., Taipei (TW)

(72) Inventors: Tzu-Jung Huang, Taipei (TW); Chin-Yen Chang, Taipei (TW); Cheng-Fan Wang, Taipei (TW)

(73) Assignee: CHANG CHUN PETROCHEMICAL CO., LTD., Taipei (TW)

( * ) Notice: Subject to any disclaimer, the term of this patent is extended or adjusted under 35 U.S.C. 154(b) by 344 days.

This patent is subject to a terminal disclaimer.

(21) Appl. No.: 16/789,265

(22) Filed: Feb. 12, 2020

(65) Prior Publication Data

US 2021/0162718 A1 Jun. 3, 2021

(30) Foreign Application Priority Data

Nov. 29, 2019 (CN) .......................... 201911201348.6
Nov. 29, 2019 (TW) ................................ 108143747

(51) Int. Cl.
*B32B 17/10* (2006.01)
*C08L 31/04* (2006.01)
*C08K 5/101* (2006.01)

(52) U.S. Cl.
CPC .. *B32B 17/10761* (2013.01); *B32B 17/10036* (2013.01); *C08K 5/101* (2013.01); *C08L 31/04* (2013.01); *B32B 2250/03* (2013.01); *B32B 2250/40* (2013.01); *B32B 2329/06* (2013.01); *C08L 2203/16* (2013.01)

(58) Field of Classification Search
CPC .......... B32B 17/10761; B32B 2329/06; B32B 2250/03; B32B 2250/40; B32B 17/10036; C08L 31/04; C08L 2203/16; C08K 5/101
USPC ....................................................... 524/503
See application file for complete search history.

(56) References Cited

U.S. PATENT DOCUMENTS

| | | | | |
|---|---|---|---|---|
| 9,833,976 | B2 * | 12/2017 | Lu | ............................ B32B 27/08 |
| 2003/0022015 | A1 | 1/2003 | Wong | |
| 2004/0191482 | A1 * | 9/2004 | Nakajima | ......... B32B 17/10761 |
| | | | | 428/156 |
| 2014/0020759 | A1 | 1/2014 | Oda et al. | |
| 2017/0157898 | A1 | 6/2017 | Nakayama et al. | |
| 2017/0266861 | A1 | 9/2017 | Keller et al. | |
| 2017/0334172 | A1 | 11/2017 | Keller | |
| 2018/0319133 | A1 | 11/2018 | Nakajima et al. | |
| 2018/0326696 | A1 | 11/2018 | Muguruma et al. | |
| 2019/0039354 | A1 | 2/2019 | Nakayama | |
| 2020/0023621 | A1 | 1/2020 | Yoshida et al. | |

FOREIGN PATENT DOCUMENTS

| | | | |
|---|---|---|---|
| CN | 103788553 | B | 8/2016 |
| CN | 107619202 | A | 1/2018 |
| CN | 108290783 | A | 7/2018 |
| JP | H5-147981 | A | 6/1993 |
| JP | 2003-528791 | A | 9/2000 |
| JP | 2001-19499 | A | 1/2001 |
| JP | 2004-168646 | A | 6/2004 |
| JP | 2017-525597 | A | 9/2017 |
| JP | 2018-8867 | A | 1/2018 |
| JP | 2018-187929 | A | 11/2018 |
| JP | 2019-529591 | A | 10/2019 |
| KR | 10-2013-0130870 | A | 2/2013 |
| TW | 201416227 | * | 5/2014 |
| TW | 201416227 | A | 5/2014 |
| TW | 201841861 | A | 12/2018 |
| WO | WO 2016/052666 | A1 | 4/2016 |
| WO | WO 2017/171032 | A1 | 10/2017 |
| WO | WO 2018/015149 | A1 | 1/2018 |
| ZA | 200200307 | B | 6/2003 |

* cited by examiner

*Primary Examiner* — Hui H Chin
(74) *Attorney, Agent, or Firm* — Christensen, Fonder, Dardi & Herbert PLLC

(57) ABSTRACT

A polymer film comprising polyvinyl acetal and a laminated glass manufactured using the same are provided. At least one surface of the polymer film has a void volume (Vv) value at a material ratio of 10% ranging from 3 $\mu m^3/\mu m^2$ to 34.3 $\mu m^3/\mu m^2$, wherein the void volume (Vv) and material ratio are defined in accordance with ISO 25178-2:2012.

18 Claims, No Drawings

POLYMER FILM AND USES OF THE SAME

CLAIM FOR PRIORITY

This application claims the benefit of Taiwan Patent Application No. 108143747 filed on Nov. 29, 2019 and China Patent Application No. 201911201348.6 filed on Nov. 29, 2019, the subject matters of which are incorporated herein in their entirety by reference.

BACKGROUND OF THE INVENTION

Field of the Invention

The present invention provides a polymer film, especially a polymer film with a specific void volume (Vv) value at a specific material ratio. The polymer film is suitable for use as an interlayer of a laminated glass.

Descriptions of the Related Art

A laminated glass is a glass material with a composite structure formed by interposing a polymer film between two glass sheets and performing hot-pressing to bond the glass sheets and the polymer film together. Since laminated glass has superior impact resistance and acoustic insulation property, they are widely used in the automobile and building industries.

In general, a laminated glass can be manufactured as follows: interposing a polymer film between two glass sheets to obtain a laminated object; pre-pressing the laminated object to remove the air between the glass sheets and polymer film; and then placing the pre-pressed laminated object into an autoclave under high temperature and pressure for a period of time to obtain a laminated glass. When preparing non-planar laminated glass, the pre-pressing step is usually performed by placing the laminated object in an airtight bag and evacuating air from the airtight bag at an elevated temperature.

Since the manufacturing process of laminated glass involves the hot-pressing of glass sheets and polymer film, it is important to avoid leaving air between the glass sheets and polymer film of the laminated glass to improve yield. A known approach of removing air between the glass sheets and polymer film of laminated glass is to form a concavo-convex structure on the surface of the polymer film to facilitate de-airing during hot-pressing. However, existing polymer films are still insufficient in the de-airing performance and usually have edge-delamination (i.e., separation of polymer film and the glass sheet at the edge of the laminated glass), such that the yield of the laminated glass is still unsatisfactory.

SUMMARY OF THE INVENTION

The present invention aims to provide a polymer film, specifically a polymer film with a specific void volume (Vv) value at a specific material ratio. The polymer film exhibits outstanding performance in the manufacturing of laminated glass which performs pre-pressing via evacuation. The polymer film can be tightly and completely bonded with glass. The manufactured laminated glass shows an excellent or good result with the bubbling test and has no edge-delamination defects. Therefore, the polymer film of the present invention is especially suitable for manufacturing automotive laminated glass.

Thus, an objective of the present invention is to provide a polymer film, which comprises polyvinyl acetal, wherein at least one surface of the polymer film has a void volume (Vv) value at a material ratio of 10% ranging from 3 $\mu m^3/\mu m^2$ to 34.3 $\mu m^3/\mu m^2$, wherein the void volume (Vv) and material ratio are defined in accordance with ISO 25178-2:2012.

In some embodiments of the present invention, each of the two surfaces of the polymer film independently has a void volume (Vv) value at a material ratio of 10% ranging from 3 $\mu m^3/\mu m^2$ to 34.3 $\mu m^3/\mu m^2$.

In some embodiments of the present invention, the polyvinyl acetal comprised by the polymer film is selected from the group consisting of poly(vinyl formal), poly(vinyl acetal), poly(vinyl butyral), poly(vinyl pentanal), poly(vinyl hexanal), and combinations thereof.

In some embodiments of the present invention, at least one surface of the polymer film has a surface roughness Rz ranging from 15 μm to 55 μm.

In some embodiments of the present invention, each of the two surfaces of the polymer film independently has a surface roughness Rz ranging from 15 μm to 55 μm.

In some embodiments of the present invention, the polymer film has a glass transition temperature (Tg) ranging from 10° C. to 22° C.

In some embodiments of the present invention, the polyvinyl acetal comprised by the polymer film has a weight average molecular weight (Mw) ranging from 150,000 daltons to 250,000 daltons.

In some embodiments of the present invention, the polymer film further comprises a plasticizer, and the amount of the plasticizer can range from 30 parts by weight to 60 parts by weight per 100 parts by weight of polyvinyl acetal.

In some embodiments of the present invention, the polymer film has a thickness ranging from 0.5 mm to 1.5 mm.

In some embodiments of the present invention, the polymer film is a multilayer film.

In some embodiments of the present invention, the polymer film further comprises an additive selected from the group consisting of dyes, pigments, stabilizers, anti-oxidants, flame retardants, infrared absorbers, infrared blocking agents, ultraviolet absorbers, ultraviolet stabilizers, lubricants, dispersing agents, surfactants, chelating agents, coupling agents, binders, adhesion controlling agents, and combinations thereof.

Another objective of the present invention is to provide a laminated glass, which comprises a first glass sheet, a second glass sheet, and the aforementioned polymer film disposed between the first glass sheet and the second glass sheet.

To render the above objectives, technical features and advantages of the present invention more apparent, the present invention will be described in detail with reference to some embodiments hereinafter.

BRIEF DESCRIPTION OF THE DRAWINGS

Not applicable.

DESCRIPTION OF THE PREFERRED EMBODIMENTS

Hereinafter, some embodiments of the present invention will be described in detail. However, without departing from the spirit of the present invention, the present invention may be embodied in various embodiments and should not be limited to the embodiments described in the specification.

Unless it is additionally explained, the expressions "a," "the," or the like recited in the specification and the claims should include both the singular and the plural forms.

Unless it is additionally explained, the expressions "first," "second," or the like recited in the specification and the claims are merely used to distinguish the illustrated elements or constituents without special meanings. Those expressions are not used to represent any priority.

Unless it is additionally explained, the term "material ratio" recited in the specification and the claims is defined in accordance with ISO 25178-2:2012. A material ratio curve means a function curve graph representing the surface height to a regional area enclosed thereby, and a material ratio means an enclosed regional area above a designated height.

Unless it is additionally explained, the term "void volume (Vv)" recited in the specification and the claims is defined in accordance with ISO 25178-2:2012. A void volume means the volume of voids per unit area at a specific material ratio.

Unless it is additionally explained, the term "surface roughness Rz" recited in the specification and the claims means a ten-point mean roughness of a surface and is measured in accordance with JIS B 0601 (1994).

The present invention provides a polymer film and a laminated glass manufactured using the same, wherein the polymer film has a specific void volume (Vv) value at a specific material ratio. The laminated glass, especially the automotive laminated glass manufactured using the polymer film, shows an excellent or good result with the bubbling test and has no edge-delamination defects. The polymer film of the present invention and the applications thereof are described in detail below.

1. POLYMER FILM 1.1. Constitution of Polymer Film

The polymer film of the present invention comprises polyvinyl acetal as an essential constituent and may further comprise other optional constituents, such as a plasticizer or other conventional additives, depending on the needs. In some embodiments of the present invention, the polymer film comprises or consists of polyvinyl acetal and a plasticizer.

Examples of polyvinyl acetal include but are not limited to poly(vinyl formal), poly(vinyl acetal), poly(vinyl butyral), poly(vinyl pentanal), and poly(vinyl hexanal). The above-mentioned polyvinyl acetal can either be used alone or in a mixture of two or more. In the appended examples, poly(vinyl butyral) is used.

As mentioned herein, a plasticizer, also called a plasticizing agent, is a chemical substance that can modify the plasticity of a thermoplastic resin. Examples of the plasticizer includes but are not limited to esters of polybasic acids or polyhydric alcohols, such as triethylene glycol bis(2-ethylhexanoate), tetraethylene glycol bis(2-ethylhexanoate), triethylene glycol bis(2-ethylbutyrate), tetraethylene glycol bis(2-ethylbutyrate), triethylene glycol diheptanoate, tetraethylene glycol diheptanoate, dihexyl adipate, dioctyl adipate, hexyl cyclohexyladipate, diisononyl adipate, heptylnonyl adipate, dibutyl sebacate, bis[2-(2-butoxyethoxy) ethyl] adipate, polymeric adipates, dipropylene glycol dibenzoate, tripropylene glycol dibenzoate, polypropylene glycol dibenzoate, isodecyl benzoate, 2-ethylhexyl benzoate, propylene glycol dibenzoate, diisononyl phthalate, dibutoxyethyl terephthalate, castor oil, methyl ricinoleate, soybean oils, epoxidized soybean oils, and combinations thereof.

Conventional additives can be any substance that can adaptively improve the workability of the polymer film during its manufacture or impart specific functions to the polymer film. Examples of conventional additives include but are not limited to dyes, pigments, stabilizers, antioxidants, flame retardants, infrared absorbers, infrared blocking agents, ultraviolet absorbers, ultraviolet stabilizers, lubricants, dispersing agents, surfactants, chelating agents, coupling agents, binders, and adhesion controlling agents. The above-mentioned additives can be used alone or in a combination thereof. For example, the polymer film can comprise a dye or pigment to form a colored polymer film. The polymer film can also comprise an ultraviolet absorber or infrared absorber to form a polymer film with an anti-ultraviolet function or a polymer film with an anti-infrared function.

The thickness of the polymer film of the present invention can be adjusted depending on the practical needs as long as the polymer film has the designated void volume (Vv) value. In general, the thickness of the polymer film can range from 0.5 mm to 1.5 mm, such as 0.51 mm, 0.52 mm, 0.53 mm, 0.54 mm, 0.55 mm, 0.56 mm, 0.57 mm, 0.58 mm, 0.59 mm, 0.6 mm, 0.61 mm, 0.62 mm, 0.63 mm, 0.64 mm, 0.65 mm, 0.66 mm, 0.67 mm, 0.68 mm, 0.69 mm, 0.7 mm, 0.71 mm, 0.72 mm, 0.73 mm, 0.74 mm, 0.75 mm, 0.76 mm, 0.77 mm, 0.78 mm, 0.79 mm, 0.8 mm, 0.81 mm, 0.82 mm, 0.83 mm, 0.84 mm, 0.85 mm, 0.86 mm, 0.87 mm, 0.88 mm, 0.89 mm, 0.9 mm, 0.91 mm, 0.92 mm, 0.93 mm, 0.94 mm, 0.95 mm, 0.96 mm, 0.97 mm, 0.98 mm, 0.99 mm, 1.0 mm, 1.01 mm, 1.02 mm, 1.03 mm, 1.04 mm, 1.05 mm, 1.06 mm, 1.07 mm, 1.08 mm, 1.09 mm, 1.1 mm, 1.11 mm, 1.12 mm, 1.13 mm, 1.14 mm, 1.15 mm, 1.16 mm, 1.17 mm, 1.18 mm, 1.19 mm, 1.2 mm, 1.21 mm, 1.22 mm, 1.23 mm, 1.24 mm, 1.25 mm, 1.26 mm, 1.27 mm, 1.28 mm, 1.29 mm, 1.3 mm, 1.31 mm, 1.32 mm, 1.33 mm, 1.34 mm, 1.35 mm, 1.36 mm, 1.37 mm, 1.38 mm, 1.39 mm, 1.4 mm, 1.41 mm, 1.42 mm, 1.43 mm, 1.44 mm, 1.45 mm, 1.46 mm, 1.47 mm, 1.48 mm, or 1.49 mm, but the present invention is not limited thereto.

The polymer film of the present invention may be a single-layer film composed of one single layer or a multilayer film composed of multiple layers, as long as the polymer film as a whole has the designated void volume (Vv) value. When the polymer film is a multilayer film, the layers of the polymer film can be made of identical or different materials and thus can be identical or different function layers. The above-mentioned functional layer may be, for example, a layer with one or more of the following functions: acoustic insulation function, thermal insulation function, reflection function, anti-reflection function, refraction function, anti-refraction function, light-splitting function, and dimming function.

1.2. Properties of Polymer Film

A concavo-convex structure of the surface of the polymer film can be determined by a three-dimensional image of surface morphology. ISO 25178-2:2012 is a measurement standard for evaluating surface morphology, which discloses void volume (Vv) as a parameter relevant to surface morphology. Void volume (Vv) is defined as the volume of voids per unit area at a specific material ratio and can be calculated from an areal material ratio curve graph. In the areal material ratio curve graph, the Y-axis denotes a surface height and the X-axis denotes a material ratio. When the material ratio of the X-axis is 0%, the surface height of the Y-axis is maximum, and when the material ratio of the X-axis is 100%, the surface height of the Y-axis is 0. For example, the void volume (Vv) at a material ratio of 10% represents the volume of voids enclosed below the horizontal cutting plane set at the surface height of the Y-axis corresponding to the material ratio of 10% of the X-axis. Therefore, when the material ratio is 0%, the void volume (Vv) value is maximum. When the material ratio is 100%, the void volume (Vv) value is 0. The relevant descriptions for the void volume (Vv) parameter can refer to ISO 25178-2:2012, and the subject matters of which are incorporated herein in their entirety by reference.

The inventor surprisingly found that the laminated glass, especially an automotive laminated glass that shows an excellent or good result with the bubbling test and has no edge-delamination defects can be provided by means of controlling the void volume (Vv) value of the polymer film used in the laminated glass at a specific material ratio. Specifically, at least one surface of the polymer film of the present invention has a void volume (Vv) value at a material ratio of 10% ranging from 3 $\mu m^3/\mu m^2$ to 34.3 $\mu m^3/\mu m^2$, such as 3.5 $\mu m^3/\mu m^2$, 4 $\mu m^3/\mu m^2$, 4.5 $\mu m^3/\mu m^2$, 5 $\mu m^3/\mu m^2$, 5.5 $\mu m^3/\mu m^2$, 6 $\mu m^3/\mu m^2$, 6.5 $\mu m^3/\mu m^2$, 7 $\mu m^3/\mu m^2$, 7.5 $\mu m^3/\mu m^2$, 8 $\mu m^3/\mu m^2$, 8.5 $\mu m^3/\mu m^2$, 9 $\mu m^3/\mu m^2$, 9.5 $\mu m^3/\mu m^2$, 10 $\mu m^3/\mu m^2$, 10.5 $\mu m^3/\mu m^2$, 11 $\mu m^3/\mu m^2$, 11.5 $\mu m^3/\mu m^2$, 12 $\mu m^3/\mu m^2$, 12.5 $\mu m^3/\mu m^2$, 13 $\mu m^3/\mu m^2$, 13.5 $\mu m^3/\mu m^2$, 14 $\mu m^3/\mu m^2$, 14.5 $\mu m^3/\mu m^2$, 15 $\mu m^3/\mu m^2$, 15.5 $\mu m^3/\mu m^2$, 16 $\mu m^3/\mu m^2$, 16.5 $\mu m^3/\mu m^2$, 17 $\mu m^3/\mu m^2$, 17.5 $\mu m^3/\mu m^2$, 18 $\mu m^3/\mu m^2$, 18.5 $\mu m^3/\mu m^2$, 19 $\mu m^3/\mu m^2$, 19.5 $\mu m^3/\mu m^2$, 20 $\mu m^3/\mu m^2$, 20.5 $\mu m^3/\mu m^2$, 21 $\mu m^3/\mu m^2$, 21.5 $\mu m^3/\mu m^2$, 22 $\mu m^3/\mu m^2$, 22.5 $\mu m^3/\mu m^2$, 23 $\mu m^3/\mu m^2$, $\mu m^3/\mu m^2$, 23.5 $\mu m^3/\mu m^2$, 24 $\mu m^3/\mu m^2$, 24.5 $\mu m^3/\mu m^2$, 25 $\mu m^3/\mu m^2$, 25.5 $\mu m^3/\mu m^2$, 26 $\mu m^3/\mu m^2$, 26.5 $\mu m^3/\mu m^2$, 27 $\mu m^3/\mu m^2$, 27.5 $\mu m^3/\mu m^2$, 28 $\mu m^3/\mu m^2$, 28.5 $\mu m^3/\mu m^2$, 29 $\mu m^3/\mu m^2$, 29.5 $\mu m^3/\mu m^2$, 30 $\mu m^3/\mu m^2$, 30.5 $\mu m^3/\mu m^2$, 31 $\mu m^3/\mu m^2$, 31.5 $\mu m^3/\mu m^2$, 32 $\mu m^3/\mu m^2$, 32.5 $\mu m^3/\mu m^2$, 33 $\mu m^3/\mu m^2$, 33.5 $\mu m^3/\mu m^2$, or 34 $\mu m^3/\mu m^2$, wherein the material ratio and void volume (Vv) are defined in accordance with ISO 25178-2: 2012. In the preferred embodiments of the present invention, each of the two surfaces of the polymer film of the present invention independently has a void volume (Vv) value at a material ratio of 10% ranging from 3 $\mu m^3/\mu m^2$ to 34.3 $\mu m^3/\mu m^2$.

In some embodiments of the present invention, at least one surface of the polymer film of the present invention further has a surface roughness Rz ranging from 15 µm to 55 µm. It is preferred that each of the two surfaces of the polymer film independently has a surface roughness Rz ranging from 15 µm to 55 µm, such as 16 µm, 17 µm, 18 µm, 19 µm, 20 µm, 21 µm, 22 µm, 23 µm, 24 µm, 25 µm, 26 µm, 27 µm, 28 µm, 29 µm, 30 µm, 31 µm, 32 µm, 33 µm, 34 µm, 35 µm, 36 µm, 37 µm, 38 µm, 39 µm, 40 µm, 41 µm, 42 µm, 43 µm, 44 µm, 45 µm, 46 µm, 47 µm, 48 µm, 49 µm, 50 µm, 51 µm, 52 µm, 53 µm, or 54 µm. The above-mentioned Rz is measured in accordance with JIS B 0601 (1994).

The method for providing the desired void volume (Vv) value and surface roughness Rz on the surface of the polymer film of the present invention can be any conventional approach. For example, the designated void volume (Vv) value and surface roughness Rz can be provided by performing machine embossing on the surface of the polymer film to form a concavo-convex structure on the surface of the polymer film and by adjusting the constitution of the polymer film or the conditions of machine embossing. As mentioned herein, the machine embossing is to form textures on the surface of the polymer film by a roller after the polymer film is formed. The methods for machine embossing include but are not limited to an embossing roller method or a calendaring roller method. The embossing roller method is preferred. The texture types provided by using machine embossing methods includes but are not limited to rhombus, line shape, sawtooth shape, square, taper shape, circular shape, sub-circular shape, and irregular shape. The above-mentioned texture types can be used alone or in a combination thereof. For example, one or more of the following approaches can be used to adjust the properties of polymer film or the conditions of machine embossing to obtain the designated void volume (Vv) value and surface roughness Rz:

(i) the polyvinyl acetal may have a weight average molecular weight (Mw) ranging from 150,000 daltons to 250,000 daltons, such as 155,000 daltons, 160,000 daltons, 165,000 daltons, 170,000 daltons, 175,000 daltons, 180,000 daltons, 185,000 daltons, 190,000 daltons, 195,000 daltons, 200,000 daltons, 205,000 daltons, 210,000 daltons, 215,000 daltons, 220,000 daltons, 225,000 daltons, 230,000 daltons, 235,000 daltons, 240,000 daltons, or 245,000 daltons; in some embodiments of the present invention, the polyvinyl acetal has a weight average molecular weight (Mw) ranging from 180,000 daltons to 205,000 daltons;

(ii) the polymer film may have a glass transition temperature (Tg) ranging from 10° C. to 22° C., such as 10.5° C., 11° C., 11.5° C., 12° C., 12.5° C., 13° C., 13.5° C., 14° C., 14.5° C., 15° C., 15.5° C., 16° C., 16.5° C., 17° C., 17.5° C., 18° C., 18.5° C., 19° C., 19.5° C., 20° C., 20.5° C., 21° C., or 21.5° C.;

(iii) in the polymer film, the amount of the plasticizer may range from 30 parts by weight to 60 parts by weight, such as 31 parts by weight, 32 parts by weight, 33 parts by weight, 34 parts by weight, 35 parts by weight, 36 parts by weight, 37 parts by weight, 38 parts by weight, 39 parts by weight, 40 parts by weight, 41 parts by weight, 42 parts by weight, 43 parts by weight, 44 parts by weight, 45 parts by weight, 46 parts by weight, 47 parts by weight, 48 parts by weight, 49 parts by weight, 50 parts by weight, 51 parts by weight, 52 parts by weight, 53 parts by weight, 54 parts by weight, 55 parts by weight, 56 parts by weight, 57 parts by weight, 58 parts by weight, or 59 parts by weight of the plasticizer, per 100 parts by weight of polyvinyl acetal;

(iv) the pressure of the embossing roller may range from 2 $kg/cm^2$ to 50 $kg/cm^2$, preferably from 5 $kg/cm^2$ to 40 $kg/cm^2$, more specifically from 10 $kg/cm^2$ to 30 $kg/cm^2$, such as 11 $kg/cm^2$, 12 $kg/cm^2$, 13 $kg/cm^2$, 14 $kg/cm^2$, 15 $kg/cm^2$, 16 $kg/cm^2$, 17 $kg/cm^2$, 18 $kg/cm^2$, 19 $kg/cm^2$, 20 $kg/cm^2$, 21 $kg/cm^2$, 22 $kg/cm^2$, 23 $kg/cm^2$, 24 $kg/cm^2$, 25 $kg/cm^2$, 26 $kg/cm^2$, 27 $kg/cm^2$, 28 $kg/cm^2$, or 29 $kg/cm^2$; and (v) the temperature of the embossing roller may range from 80° C. to 150° C., preferably from 90° C. to 140° C., more specifically from 100° C. to 130° C., such as 101° C., 102° C., 103° C., 104° C., 105° C., 106° C., 107° C., 108° C., 109° C., 110° C., 111° C., 112° C., 113° C., 114° C., 115° C., 116° C., 117° C., 118° C., 119° C., 120° C., 121° C., 122° C., 123° C., 124° C., 125° C., 126° C., 127° C., 128° C., or 129° C. When the temperature of embossing roller is not within the designated range, the polymer film may not have the desired void volume (Vv) value.

1.3. Manufacture of Polymer Film

The method for manufacturing the polymer film of the present invention is not particularly limited. For example, the polymer film of the present invention may be manufactured by mixing and kneading polyvinyl acetal and optional constituents (e.g., a plasticizer) to obtain a polymer composition, using the polymer composition to provide a polymer film by means of a conventional method, and optionally performing a machine embossing step to provide the desired void volume (Vv) value and surface roughness Rz on the surface of the polymer film. Examples of the conventional method for providing the polymer film include but are not limited to a calendering method, a casting method, an extrusion stretching method, a direct extruding method, and an extrusion blowing method.

In some embodiments of the present invention, the polymer film is manufactured as follows: mixing and kneading a polyvinyl acetal resin and a plasticizer by using a mixer at a temperature ranging from 100° C. to 150° C. and a rotation speed ranging from 10 rpm to 50 rpm for 5 minutes to 30 minutes to obtain a polymer composition; cooling down the polymer composition to room temperature, then placing it in a hot presser and hot-pressing it at a temperature ranging from 100° C. to 200° C. and a pressure ranging from 2 kg to 5 kg for 1 minute to 10 minutes to form a film; optionally repeating the above-mentioned film-forming steps and adjusting the constitution of the polymer composition to provide films with different functions, then laminating the films to form a polymer film with a multilayer structure; and performing a machine embossing step to the polymer film to provide the desired void volume (Vv) value and surface roughness Rz. The conditions of machine embossing are as follows: the pressure of the embossing roller ranges from 10 kg/cm$^2$ to 30 kg/cm$^2$, and the temperature of the embossing roller ranges from 100° C. to 130° C.

2. LAMINATED GLASS

The polymer film of the present invention is suitable for use as an interlayer of a laminated glass. Thus, the present invention also provides a laminated glass, which comprises a first glass sheet, a second glass sheet, and the aforementioned polymer film disposed between the first glass sheet and the second glass sheet.

The first glass sheet and the second glass sheet may be identical to or different from each other. The first glass sheet and the second glass sheet each can be any conventional glass sheet for manufacturing laminated glass. The conventional glass sheets for manufacturing laminated glass include but are not limited to float glass, tempered glass, wired glass, or plain plate glass. In the appended examples, float glass is used as the first glass sheet and the second glass sheet.

The laminated glass of the present invention can be manufactured by any method known in the art. For example, the laminated glass of the present invention can be manufactured as follows. A polymer film is interposed between two glass sheets to obtain a laminated object, the laminated object is placed into an airtight bag, and the air in the airtight bag is evacuated from the airtight bag (vacuum degree: >500 mmHg) at a temperature of 20° C. to 30° C. for at least 10 minutes. Then, the airtight bag with laminated object contained therein is placed into a heating furnace, wherein the temperature of the heating furnace was slowly increased from 60° C. to 130° C. After at least 30 minutes, the airtight bag is taken out from the heating furnace to complete pre-pressing. Then, the pre-pressed laminated object is placed in an autoclave and hot-pressed under a high pressure and temperature condition for 100 minutes to 150 minutes to obtain a laminated glass. The aforementioned high pressure and temperature condition refers to a pressure ranging from 10 bars to 15 bars and a temperature ranging from 100° C. to 150° C.

3. EXAMPLES

3.1. Testing Methods

The present invention is further illustrated by the embodiments hereinafter, wherein the testing instruments and methods are as follows.

[Measurement of Molecular Weight Distribution of Polyvinylacetal]

The molecular weight distribution of polyvinylacetal is measured by means of gel permeation chromatography (GPC), wherein polyvinylacetal is dissolved in tetrahydrofuran (THF) and subjected to GPC analysis under the conditions below. The molecular weight of polyvinyl acetal is calculated based on the ratio corresponding to the area of standard polystyrene (Water PS STD).

Device: Waters 1515 PUMP system
Detector: Waters 2414 RI
Elution condition: 1.0 mL/min, THF
Column: Waters Styragel HR5 THF, Waters Styragel HR4 THF, Waters Styragel HR3 THF,
Waters Styragel HR1 THF

[Measurement of Void Volume (Vv)]

The void volume (Vv) value at a material ratio of 10% of a surface of the polymer film is measured by using a laser confocal microscope (model no.: LEXT OLS5000-SAF, available from Olympus) at a temperature of 24±3° C. and a relative humidity of 63±3% in accordance with ISO 25178-2:2012. The measuring conditions are as follows: the light source has a wavelength of 405 nm, the objective lenses are 100× (MPLAPON-100×LEXT), the optical zoom is 50×, the observation area is 1500 μm×1500 μm, the resolution is 1024 pixels×1024 pixels, the operation conditions are set to auto tilt removal, and no filter is used. In the obtained material ratio curve graph, the core void volume (Vvc) value and dale void volume (Vvv) value can be obtained. The void volume (Vv) value is the sum of the core void volume (Vvc) value and the dale void volume (Vvv) value. The unit of void volume (Vv) is μm$^3$/μm$^2$.

[Measurement of Surface Roughness Rz]

The surface roughness Rz is measured by using a roughness tester (model name: SE 300, available from KOSAKA Laboratory Ltd.) in accordance with JIS B 0601 (1994). First, the polymer film is cut into a test sample of 8 cm×30 cm. The conditions of measuring are set as follows: the vertical magnification is set to automatic, the horizontal magnification is set to 25 mm/λ$_c$, the cut off distance is set to 2.5 mm (i.e., calculating once per 2.5 mm), the length of evaluation is seven (7) times the cut off distance, the baseline length is set to 17.5 mm, and the measuring direction is the machine direction.

[Measurement of Glass Transition Temperature (Tg)]

The Tg of the polymer film is measured in a nitrogen atmosphere by using a differential scanning calorimeter (model no.: TA DSC 25, available from TA Instruments). First, 7 mg of the polymer film as a sample is placed on the sample platform of the differential scanning calorimeter, heated to 150° C. with a heating rate of 10° C./min, and held at the temperature for 5 minutes. The sample is then balanced at −50° C. and held at the temperature for 5 minutes. After that, the sample is heated to 100° C. with a heating rate of 10° C./min to obtain a curve graph of temperature to heat flow (X-axis is temperature and Y-axis is heat flow). The temperature corresponding to glass transition midpoint is recorded as Tg.

[Bubbling Test]

The laminated glass is cut to a test sample with a width of 30 cm and a length of 30 cm. The test sample is placed vertically in an oven at 120° C. for fourteen (14) days. Then, the test sample is visually observed to check whether bubbling is found, wherein the bubbling means there are bubbles which are not in contact with external air between the glass sheet and the polymer film. The criteria of bubbling test is as follows: if there is no bubble in the test sample, the result of bubbling test is excellent and recorded as "⊚"; if there is only one (1) bubble in the test sample and the diameter of the bubble is smaller than 0.5 mm, the result of bubbling test is good and recorded as "○"; if there are two (2) or more bubbles with a diameter smaller than 0.5 mm or one (1) bubble with a diameter larger than 0.5 mm in the test sample, the result of bubbling test is poor and recorded as "x".

[Edge-Delamination Test]

The laminated glass is cut to a test sample with a width of 30 cm and a length of 30 cm. The test sample is placed vertically in an oven at 50° C. and a relative humidity of 95% for fourteen (14) days. Then the test sample is visually observed to check whether edge-delamination is found. The criteria of edge-delamination test is as follows: if the test sample does not have edge-delamination (i.e., the polymer film is tightly bonded with glass sheets), the result of edge-delamination test is passed and recorded as "⊚"; by contrast, if the test sample has edge-delamination (i.e., the polymer film is not tightly bonded with glass sheets), the result of edge-delamination test is failed and recorded as "x".

3.2. List of Raw Materials Used in Examples and Comparative Examples

TABLE 1

| List of raw materials | |
| --- | --- |
| Model No. or abbreviation of raw material | Descriptions |
| PVB | Poly(vinyl butyral), available from Chang Chun Petrochemical Co., Ltd. |
| 3GO | Plasticizer, triethylene glycol bis(2-ethylhexanoate) |

3.3. Manufacture and Properties of Polymer Film

The polymer film of Examples 1 to 9 and Comparative Examples 1 to 7 were manufactured as follows. First, 100 parts by weight of PVB and 38.5 parts by weight of 3GO were mixed to obtain a mixture. The mixture was kneaded by using a mixer at 120° C. and a rotation speed of 35 rpm for 15 minutes, and then the mixture was cooled to room temperature to obtain a polymer film composition. Next, the polymer film composition was placed in a hot-presser and subjected to hot-pressing at 150° C. and a pressure of 3 kg for 3 minutes to obtain a polymer film.

Afterwards, the two surfaces of the polymer film were optionally subjected to machine embossing. The conditions of machine embossing were shown in Tables 2-1 and 2-2, and the linear velocity of the polymer film passing through the pair of embossing rollers ranges from 10 m/min to 18 m/min.

The molecular weight of PVB of the polymer films of Examples 1 to 9 and Comparative Examples 1 to 7, as well as the thickness, Tg, surface roughness Rz, and void volume (Vv) at a material ratio of 10% of the polymer films of Examples 1 to 9 and Comparative Examples 1 to 7 were measured according to the aforementioned testing methods. The results are listed in Tables 2-1 and 2-2.

TABLE 2-1

Conditions of machine embossing and properties of PVB and polymer film of Examples 1 to 9

| | Unit | Example | | | | | | | | |
| --- | --- | --- | --- | --- | --- | --- | --- | --- | --- | --- |
| | | 1 | 2 | 3 | 4 | 5 | 6 | 7 | 8 | 9 |
| Pressure of embossing rollers | kg/cm² | 10 | 10 | 10 | 10 | 30 | 30 | 30 | 30 | 20 |
| Temperature of embossing rollers | ° C. | 100 | 130 | 100 | 130 | 100 | 130 | 100 | 130 | 120 |
| Molecular weight (Mw) of PVB | daltons | 186341 | 196523 | 195243 | 188543 | 202277 | 186303 | 203875 | 188399 | 189945 |
| Thickness of polymer film | mm | 0.76 | 0.76 | 0.76 | 0.76 | 0.76 | 0.76 | 0.76 | 0.76 | 0.76 |
| Tg of polymer film | ° C. | 12.53 | 12.48 | 17.33 | 17.35 | 12.67 | 12.47 | 17.52 | 17.55 | 14.53 |
| Rz of polymer film | μm | 43.968 | 40.854 | 41.001 | 39.112 | 41.868 | 43.994 | 42.456 | 39.227 | 21.348 |
| Vv of polymer film | μm³/μm² | 9.052 | 20.61 | 3.068 | 19.036 | 27.27 | 34.267 | 25.072 | 30.248 | 22.259 |

TABLE 2-2

Conditions of machine embossing and properties of PVB and polymer film of Comparative Examples 1 to 7

| | Unit | Comparative Example | | | | | | |
|---|---|---|---|---|---|---|---|---|
| | | 1 | 2 | 3 | 4 | 5 | 6 | 7 |
| Pressure of embossing rollers | kg/cm² | Not applicable | 2 | 40 | 20 | 20 | 20 | 20 |
| Temperature of embossing rollers | °C. | Not applicable | 120 | 120 | 120 | 120 | 80 | 140 |
| Molecular weight (Mw) of PVB | daltons | 183652 | 186301 | 190034 | 189752 | 190366 | 185254 | 185254 |
| Thickness of polymer film | mm | 0.76 | 0.76 | 0.76 | 0.76 | 0.76 | 0.76 | 0.76 |
| Tg of polymer film | °C. | 14.38 | 15.34 | 15.87 | 3.54 | 20.36 | 14.93 | 14.58 |
| Rz of polymer film | μm | 38.823 | 38.763 | 43.339 | 38.312 | 38.559 | 39.141 | 40.769 |
| Vv of polymer film | μm³/μm² | 1.686 | 1.791 | 35.344 | 1.585 | 1.641 | 1.773 | 36.296 |

3.4. Manufacture and Properties of Laminated Glass

Laminated glass was manufactured respectively by using the polymer films of Examples 1 to 9 and Comparative Examples 1 to 7. First, two pieces of clean transparent float glass sheets (length: 300 mm; width: 150 mm; thickness: 2 mm to 4 mm) were provided. The polymer films of Examples 1 to 9 and Comparative Examples 1 to 7 were interposed respectively between the two pieces of transparent float glass sheets to obtain a laminated object. The laminated object was pre-pressed by means of evacuation using an airtight bag. The pre-pressing was performed as follows. The laminated object was placed into an airtight bag, and air was evacuated from the airtight bag (vacuum degree: >500 mmHg) at a temperature of 20° C. to 30° C. for at least 10 minutes. Next, the airtight bag with the laminated object contained therein was placed into a heating furnace, kept at a temperature of 20° C. to 30° C. for 10 minutes to 20 minutes, then heated to 60° C. to 130° C. and kept for 15 minutes to 45 minutes. Afterwards, the airtight bag was taken out from the heating furnace and allowed to cool to room temperature. Then, the pre-pressed laminated object was taken out from the airtight bag, placed in an autoclave, subjected to a hot-pressing at a pressure of 13 bars and a temperature of 135° C. for 120 minutes, and then cooled to room temperature to obtain a laminated glass.

The bubbling test and edge-delamination test for the laminated glasses of Examples 1 to 9 and Comparative Examples 1 to 7 were evaluated according to the aforementioned testing methods, and the results are listed in Tables 3-1 and 3-2.

TABLE 3-1

Properties of laminated glasses of Examples 1 to 9

| | Example | | | | | | | | |
|---|---|---|---|---|---|---|---|---|---|
| | 1 | 2 | 3 | 4 | 5 | 6 | 7 | 8 | 9 |
| Bubbling test | ○ | ⊚ | ○ | ⊚ | ⊚ | ⊚ | ○ | ⊚ | ○ |
| Edge-delamination test | ⊚ | ⊚ | ⊚ | ⊚ | ⊚ | ⊚ | ⊚ | ⊚ | ⊚ |

TABLE 3-2

Properties of laminated glasses of Comparative Examples 1 to 7

| | Comparative Example | | | | | | |
|---|---|---|---|---|---|---|---|
| | 1 | 2 | 3 | 4 | 5 | 6 | 7 |
| Bubbling test | X | X | ○ | X | X | X | ○ |
| Edge-delamination test | X | X | X | X | X | X | X |

As shown in Table 3-1, the laminated glass manufactured from the polymer film of the present invention passed the bubbling test and the edge-delamination test, showing an excellent or good result with the bubbling test without any edge-delamination defects. In particular, as shown in Examples 1 to 9, though the molecular weight of PVB, Tg and embossing conditions are varied, each of the laminated glass can meet the requirements of showing excellent or good results with the bubbling test and having edge-delamination as long as the void volume (Vv) value at a material ratio of 10% of the polymer film is within the designated range.

By contrast, as shown in Table 3-2, the laminated glass manufactured from the polymer film that does not belong to the present invention cannot meet the requirements of showing excellent or good results with the bubbling test and having no edge-delamination. In particular, as shown in Comparative Examples 1, 2 and 4 to 6, regardless of the molecular weight of PVB, Tg and embossing conditions, none of the laminated glass can pass the bubbling test and have no edge-delamination when the void volume (Vv) value of the polymer film is lower than the designated range. Also, as shown in Comparative Examples 3 and 7, when the void volume (Vv) value of the polymer film is higher than the designated range, though the laminated glass shows good results with the bubbling test, it still has edge-delamination.

The above examples are used to illustrate the principle and efficacy of the present invention and show the inventive features thereof, but are not used to limit the scope of the present invention. People skilled in this field may proceed with a variety of modifications and replacements based on the disclosures and suggestions of the invention as described without departing from the principle and spirit thereof.

Therefore, the scope of protection of the present invention is that as defined in the claims as appended.

What is claimed is:

1. A polymer film, which comprises polyvinyl acetal, wherein at least one surface of the polymer film has a void volume (Vv) value at a material ratio of 10% ranging from 3 $\mu m^3/\mu m^2$ to 34.3 $\mu m^3/\mu m^2$, wherein the void volume (Vv) and material ratio are defined in accordance with ISO 25178-2:2012,
wherein the polymer film has a glass transition temperature (Tg) ranging from 12° C. to 22° C.

2. The polymer film of claim 1, wherein each of the two surfaces of the polymer film independently has a void volume (Vv) value at a material ratio of 10% ranging from 3 $\mu m^3/\mu m^2$ to 34.3 $\mu m^3/\mu m^2$.

3. The polymer film of claim 1, wherein the polyvinyl acetal is selected from the group consisting of poly(vinyl formal), poly(vinyl acetal), poly(vinyl butyral), poly(vinyl pentanal), poly(vinyl hexanal), and combinations thereof.

4. The polymer film of claim 1, wherein at least one surface of the polymer film has a surface roughness Rz ranging from 15 μm to 55 μm.

5. The polymer film of claim 2, wherein each of the two surfaces of the polymer film independently has a surface roughness Rz ranging from 15 μm to 55 μm.

6. The polymer film of claim 1, wherein the polyvinyl acetal has a weight average molecular weight (Mw) ranging from 150,000 daltons to 250,000 daltons.

7. The polymer film of claim 1, which further comprises a plasticizer.

8. The polymer film of claim 2, which further comprises a plasticizer.

9. The polymer film of claim 7, wherein the amount of the plasticizer ranges from 30 parts by weight to 60 parts by weight per 100 parts by weight of polyvinyl acetal.

10. The polymer film of claim 8, wherein the amount of the plasticizer ranges from 30 parts by weight to 60 parts by weight per 100 parts by weight of polyvinyl acetal.

11. The polymer film of claim 1, which has a thickness ranging from 0.5 mm to 1.5 mm.

12. The polymer film of claim 2, which has a thickness ranging from 0.5 mm to 1.5 mm.

13. The polymer film of claim 1, which is a multilayer film.

14. The polymer film of claim 2, which is a multilayer film.

15. The polymer film of claim 1, which further comprises an additive selected from the group consisting of dyes, pigments, stabilizers, anti-oxidants, flame retardants, infrared absorbers, infrared blocking agents, ultraviolet absorbers, ultraviolet stabilizers, lubricants, dispersing agents, surfactants, chelating agents, coupling agents, binders, adhesion controlling agents, and combinations thereof.

16. The polymer film of claim 2, which further comprises an additive selected from the group consisting of dyes, pigments, stabilizers, anti-oxidants, flame retardants, infrared absorbers, infrared blocking agents, ultraviolet absorbers, ultraviolet stabilizers, lubricants, dispersing agents, surfactants, chelating agents, coupling agents, binders, adhesion controlling agents, and combinations thereof.

17. A laminated glass, which comprises a first glass sheet, a second glass sheet, and the polymer film of claim 1 disposed between the first glass sheet and the second glass sheet.

18. A laminated glass, which comprises a first glass sheet, a second glass sheet, and the polymer film of claim 2 disposed between the first glass sheet and the second glass sheet.

* * * * *